(12) United States Patent
Isaksson

(10) Patent No.: US 6,227,720 B1
(45) Date of Patent: May 8, 2001

(54) FIBER OPTIC CONNECTION DEVICE

(75) Inventor: Jan Isaksson, Järfälla (SE)

(73) Assignee: Mitel Semiconductor AB, Jarfalla (SE)

( * ) Notice: Subject to any disclaimer, the term of this patent is extended or adjusted under 35 U.S.C. 154(b) by 0 days.

(21) Appl. No.: 09/252,082

(22) Filed: Feb. 18, 1999

(30) Foreign Application Priority Data

Feb. 19, 1998 (GB) .................................................. 9803465

(51) Int. Cl.7 ...................................................... G02B 6/38
(52) U.S. Cl. .................................. 385/75; 385/59; 385/88; 385/89; 385/92
(58) Field of Search .............................. 385/75, 88, 89, 385/92, 59

(56) References Cited

U.S. PATENT DOCUMENTS

| | | | |
|---|---|---|---|
| 4,427,879 | * | 1/1984 | Becher et al. ................. 250/215 |
| 4,678,264 | * | 7/1987 | Bowen et al. ................. 385/89 |
| 4,993,803 | | 2/1991 | Suverison et al. . |
| 5,104,243 | * | 4/1992 | Harding ................. 385/84 |
| 5,212,754 | * | 5/1993 | Basavanhally et al. ........... 385/90 |
| 5,307,362 | * | 4/1994 | Tanaka et al. ................. 372/50 |
| 5,329,428 | | 7/1994 | Block et al. . |
| 5,367,593 | | 11/1994 | Lebby et al. . |
| 5,546,281 | | 8/1996 | Poplawski . |
| 5,615,292 | * | 3/1997 | Beckwith ................. 385/89 |

FOREIGN PATENT DOCUMENTS

| | | |
|---|---|---|
| 456298 | 4/1991 | (EP) . |
| 2142736 | 5/1983 | (GB) . |
| 2228939 | 12/1994 | (GB) . |
| WO 95/34836 | 12/1995 | (WO) . |

OTHER PUBLICATIONS

Kosaka, Hideo, "VCSEL and Its Applications for Optical Interconnection and Switch," Expanded Abstracts of the 1997 International Conference on Solid State Devices and Materials, 1997, pp. 58–59, Hamamatsu.

* cited by examiner

Primary Examiner—Hemang Sanghavi
Assistant Examiner—Sung Pak
(74) Attorney, Agent, or Firm—Laubscher & Laubscher

(57) ABSTRACT

An adapter for coupling optical and electronic circuits, has a housing including a first portion for mating with an optic fiber termination device, and a second portion for mating with an electronic termination device. At least one electro-optical transducer in the housing has an optical interface for coupling with the optical termination device and an electronic interface for coupling with the electronic termination device. The adapter converts signals between optical and electronic form.

4 Claims, 3 Drawing Sheets

FIBER OPTIC CONNECTION DEVICE

FIELD OF THE INVENTION

This invention relates to an adapter device for optic fibers, for example, for connecting optic fibers to a printed circuit card.

BACKGROUND OF THE INVENTION

Optic fibers are becoming more common as a transmission medium to carry additional signals between user devices. The active circuitry in the user devices is generally electronic, and some means must be provided to convert the digital data in electronic form to digital data in optical form or vice versa. This conversion is typically performed by a photodiode array, for example using VCSELs, which receives electronic digital impulses and converts them to optical impulses for transmission down an optic fiber and vice versa.

Traditionally, manufacturers of electronic devices are not familiar with optical technology and do not have experience with optic fibers and how to make good optic fiber connections, which can be troublesome. Adding optical connections to their devices adds to the time and expense of manufacture.

An object of the this invention is to address this problem.

SUMMARY OF THE INVENTION

Accordingly the present invention provides an adapter for coupling optical and electronic circuits, comprising a housing including a first portion for mating with an optic fiber termination device, a second portion for mating with an electrical terminal device, at least one electro-optical transducer in said housing having an optical interface for coupling with said optical termination device, and an electrical interface for coupling with said electrical termination device, whereby said adapter converts signals between optical and electronic form and permits an optic fiber line to be directly connected therethrough to equipment provided with an electrical terminal.

The electro-optical transducers are typically in the form of a linear array mating with a line of fibers exposed in the end face of the optical termination device. The adapter can be a transmitter and/or receiver of optical signals using photodiodes. The transmitters are preferably VCSELs (Vertical Cavity Surface Emitting Lasers).

The adapter preferably fits into a standard telephone jack, for example, an AMP modular plastic handset plug type 0.89, or line cord plug type 0.35. This enables the manufacturer of a printed circuit card device to mount a standard electrical socket on the card. Optical connections can be made by inserting the optical termination device into the adapter and in turn plugging the electrical portion of the adapter into the socket mounted on the card.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
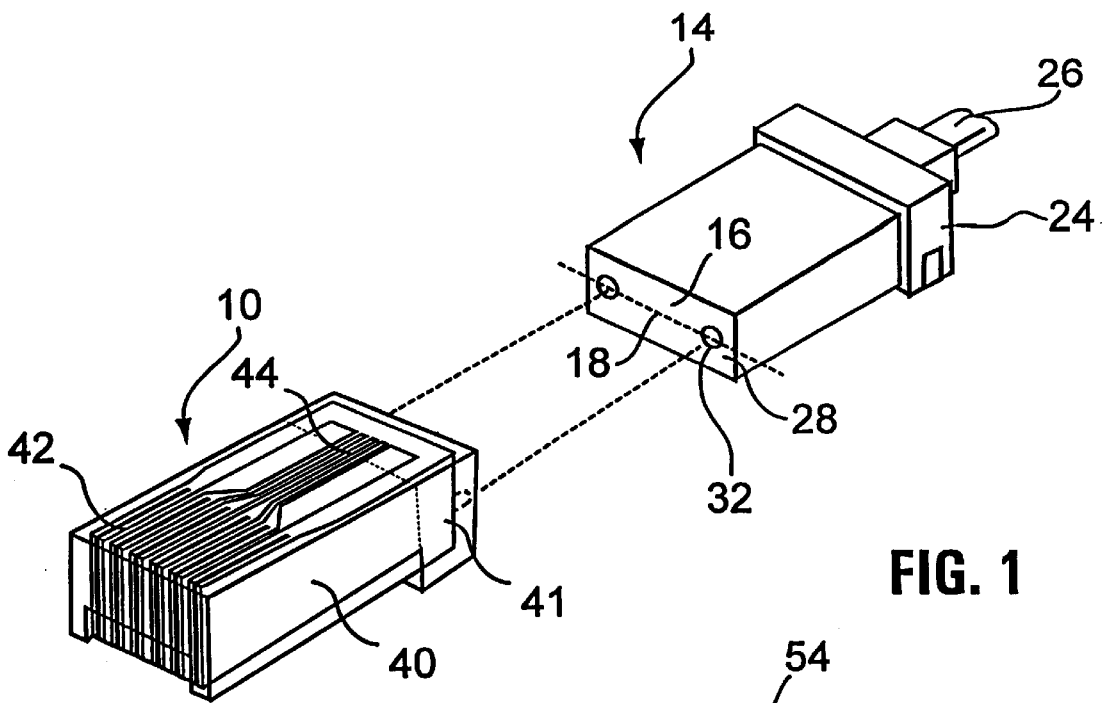
FIG. 1 is an exploded view of an adapter and optical termination unit in accordance with one embodiment of the invention.

Referring now to FIG. 1, the adapter 10 mates with an optical termination unit 14. This termination unit 14 acts as a harness terminating an optic fiber bundle 26. The termination unit 14 consists of a generally rectangular housing with a front frame 24 and a rear face 16. The rear face 16 exposes a line of the optic fiber ends 18 connected to respective fibers 30, which emerge through the fiber bundle 26.

The rear face 16 of the termination unit 14 displays a pair of parallel longitudinal bores 32, which are used for alignment purposes in a manner to be described. The adapter 10, which can be formed from a conventional standard telephone jack by suitable modification, comprises a housing 40 with a series of electrical contacts 42 designed to establish electrical connection with contacts inside a modular terminal socket of conventional type. The telephone jack is modified by adding an extension 41 defining a female end and leading wires 44 from the contacts 42 to a mounting frame 43 located in a recess 50 in the female end of the housing 40. The mounting frame 43 supports a row of the LEDs (light emitting diodes) and/or photo diodes 48 which align with the optic fibers 18 in the optical termination device 14. The LEDs are conveniently VCSELs, i.e. vertical cavity surface emitting lasers.

The internal end face of the housing 40 has protruding therefrom a pair of round pins 52 which engage in bores 32 in the end of termination unit 14 and thereby ensure a precise alignment of the optical termination device 14 with the housing 40 when the spigot end of the termination device 14 is snugly inserted into the recess 50.

The adapter 10 can be conveniently manufactured by molding in a similar manner to a conventional telephone jack, or alternatively it can be made by adding an extra piece on to the end of a telephone jack.

Figure 3:
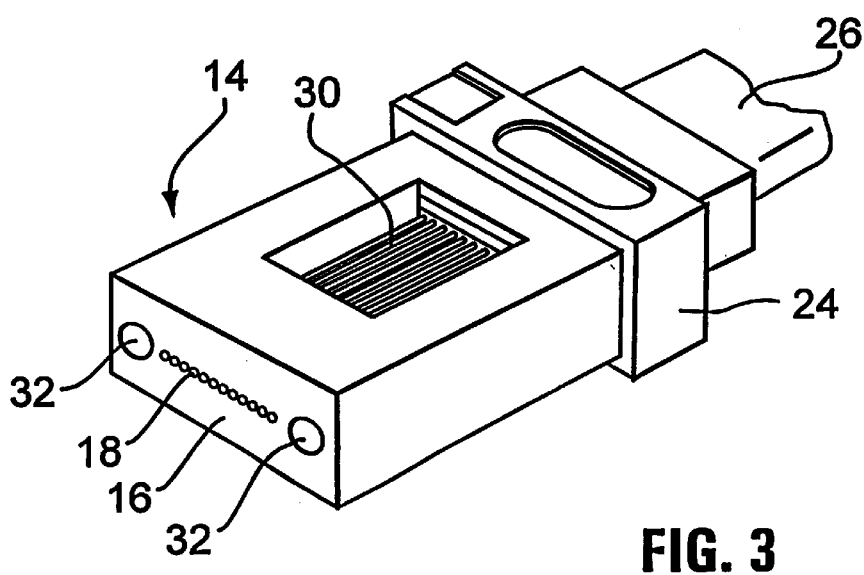
FIG. 3 is a perspective view of an optical termination unit.

FIG. 3 is a more detailed view of the optical termination unit 14 or optic fiber harness. This is dimensioned to make a snug fit into the recess 50 of the adapter in such a way that precise alignment of the optic fiber ends 18 with the transducers in the adapter 10 is ensured.

Figure 2:
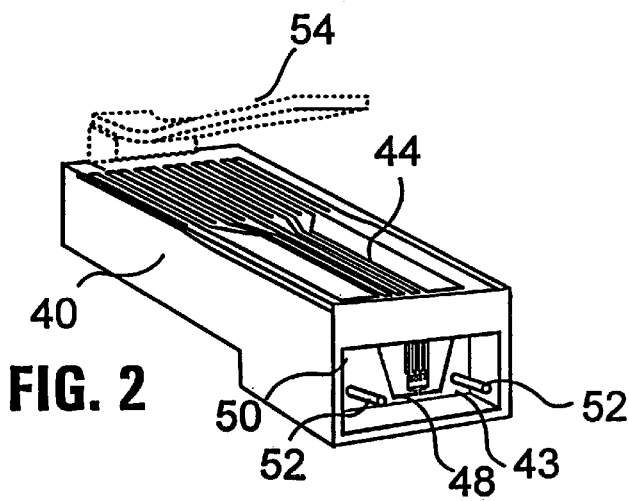
FIG. 2 is a perspective view of an adapter.
Figure 4:
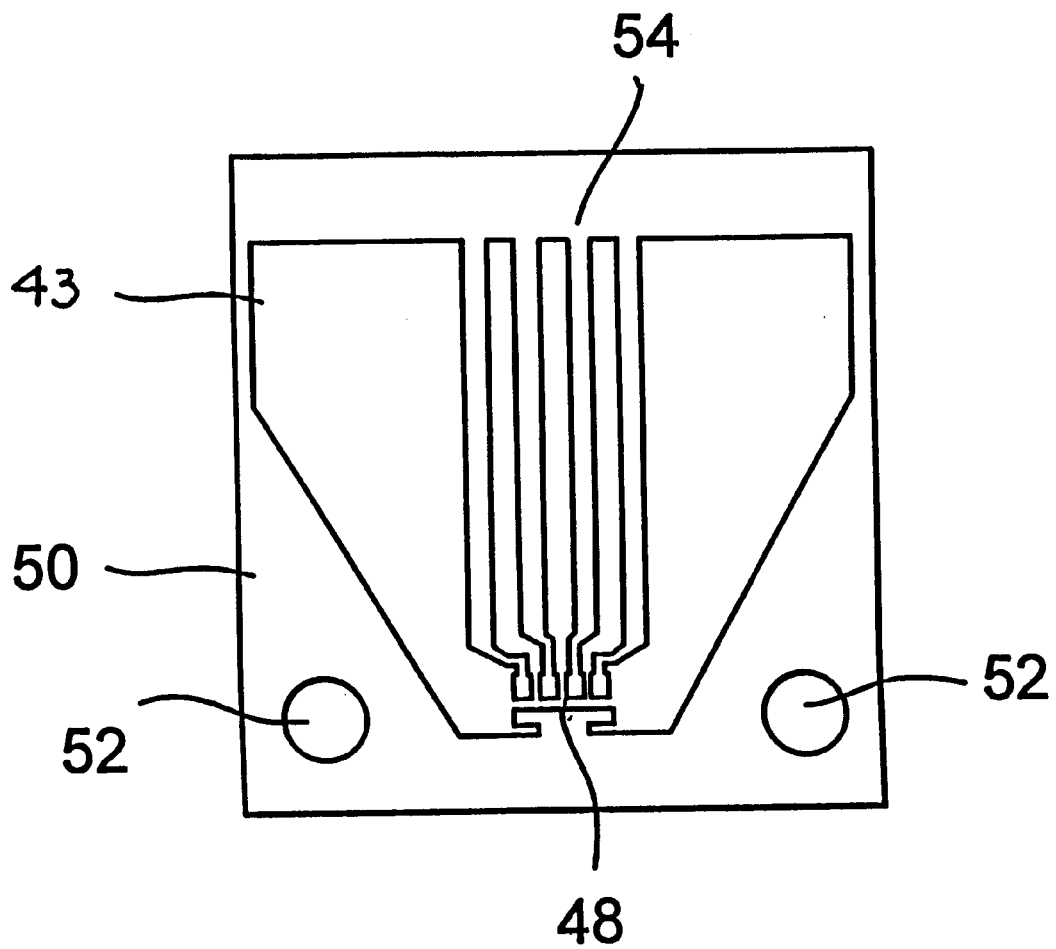
FIG. 4 is a front elevation of a mounting frame.

FIG. 4 is a more detailed view of a mounting frame 43 as shown in FIG. 2. The mounting frame 43 comprises a metal sheet having cut out therefrom contact wires 54 that establish contact with LEDs 48 so as to carry the signals from the electrical side of the adapter to the optical side.

Figure 5:
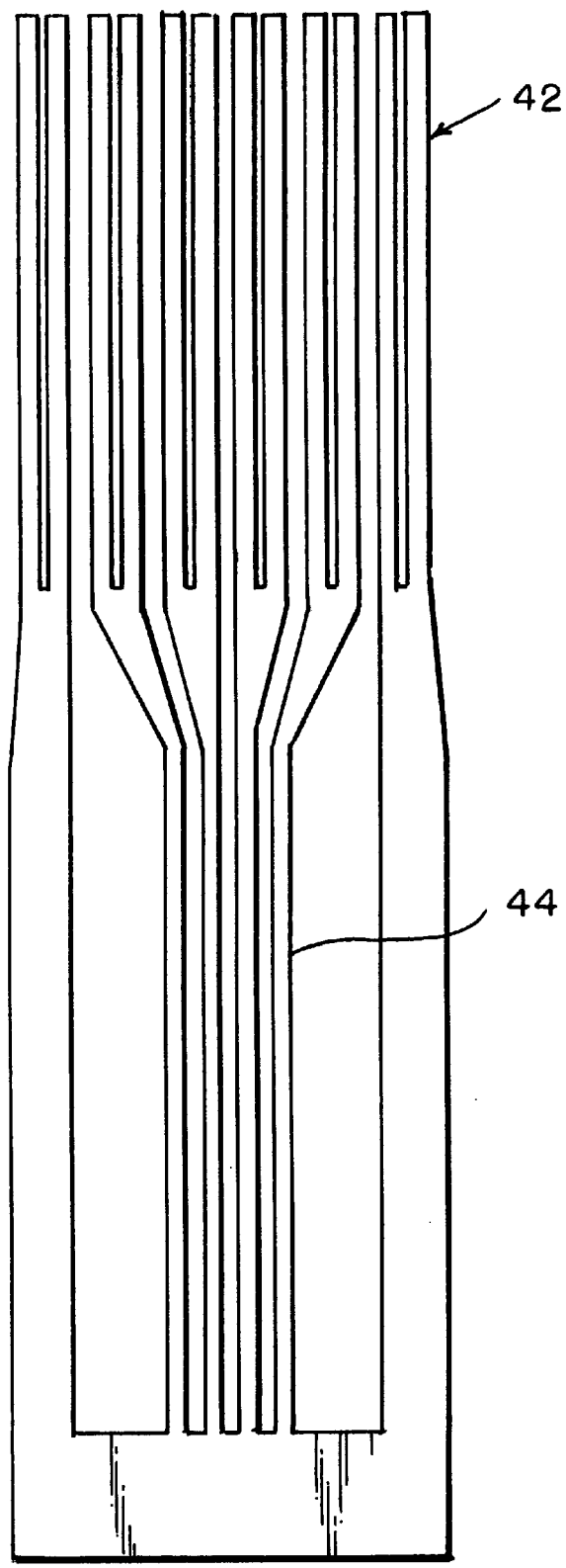
FIG. 5 is a plan view of the connection lay-out in the adapter.

FIG. 5 is an enlarged plan view of the contacts 42 and leads 44 which carry the electrical signals from the electrical end of the device to the mounting frame for connection to the transducers 18.

The described adapter makes it very easy for manufacturers to use the fiber optics with their equipment without the need for specialized knowledge. The manufacturer of a printed circuit card, for example, can simply provide the circuit with a standard electrical socket in the conventional manner, and in order to connect an optical fiber, it is merely necessary to connect the standard optical fiber termination unit into the described adapter which insures a satisfactory optical coupling between the transducers and the ends of the optic fibers. The adapter can then be plugged into the electrical socket in a conventional manner, thereby establishing contact between the circuit card and the optical fibers.

The adapter also has a spring tongue 54 that it engages in a conventional telephone a socket in a manner known per se.

I claim:

1. A connection arrangement for coupling optical and electronic circuits, comprising:

an optic fiber termination device having a rectangular male body portion with an end face exposing a row of optic fibers;

a rectangular housing having first and second end faces at opposite ends thereof, said first end face of said rectangular housing being located in a rectangular recess providing a female portion at one end of said housing mating with said end face of said male body portion of said optic fiber termination device, said male body portion of said optic fiber termination device snugly fitting in said rectangular recess, and said second end face providing a male portion for mating with a female portion of an electrical terminal device, said second end face carrying exposed electrical contacts;

a mounting frame on said first end face supporting a row of VCSELs connected to respective said electrical contacts on said second end face for converting electrical signals to optical signals; and a pair of protruding locating pins on either side of said mounting frame in said recess and received in corresponding bores in said end face of said optic fiber termination device to ensure precise alignment of said VCSELs with said respective exposed optic fibers of said optic fiber termination device;

whereby signals carried on said optic fibers can be directly passed through said connection arrangement to equipment provided with an electrical terminal.

2. A connection arrangement as claimed in claim 1, wherein said VCSELS are connected to said exposed electrical contacts by wires formed on the surface of said rectangular housing.

3. A connection arrangement as claimed in claim 1, wherein said housing male portion with said electrical contacts is adapted to plug into an electrical socket.

4. A connection arrangement as claimed in claim 3, wherein said male portion of said housing is adapted to mate with a standard telephone jack.

* * * * *